United States Patent
Sproat et al.

(10) Patent No.: US 9,198,537 B2
(45) Date of Patent: Dec. 1, 2015

(54) QUICK-COOK BEAN POT

(71) Applicants: Eliza Sproat, Columbus, OH (US);
Tarik EL-Maraghy, Columbus, OH (US)

(72) Inventors: Eliza Sproat, Columbus, OH (US);
Tarik EL-Maraghy, Columbus, OH (US)

( * ) Notice: Subject to any disclaimer, the term of this patent is extended or adjusted under 35 U.S.C. 154(b) by 30 days.

(21) Appl. No.: 13/971,837

(22) Filed: Aug. 21, 2013

(65) Prior Publication Data
US 2015/0053694 A1    Feb. 26, 2015

(51) Int. Cl.
| | |
|---|---|
| A47J 27/022 | (2006.01) |
| A47J 36/02 | (2006.01) |
| A47J 27/00 | (2006.01) |
| A47J 27/02 | (2006.01) |

(52) U.S. Cl.
CPC ............... *A47J 36/02* (2013.01); *A47J 27/002* (2013.01)

(58) Field of Classification Search
CPC ....... A47J 27/02; A47J 27/022; A47J 27/002; A47J 36/02
USPC .............. D7/360, 354; 220/626, 62.17, 62.13
See application file for complete search history.

(56) References Cited

U.S. PATENT DOCUMENTS

| | | | | | |
|---|---|---|---|---|---|
| 906,628 | A | * | 12/1908 | Holley | 220/573.1 |
| D113,990 | S | * | 3/1939 | Lacy | D7/354 |
| 2,348,549 | A | * | 5/1944 | Kraft | 215/12.2 |
| D422,835 | S | * | 4/2000 | Dadez | D7/354 |
| D548,516 | S | * | 8/2007 | Tanguy | D7/354 |
| D618,953 | S | * | 7/2010 | Li | D7/354 |
| 8,747,933 | B1 | * | 6/2014 | McGinn | 426/510 |
| 2011/0011872 | A1 | * | 1/2011 | Fulton-Morales | 220/573.1 |
| 2013/0206777 | A1 | * | 8/2013 | Hoekstra | 220/573.1 |

* cited by examiner

*Primary Examiner* — Mickey Yu
*Assistant Examiner* — Niki Eloshway

(57) ABSTRACT

In summary there is provided in one embodiment a quick-cook bean pot which creates an environment whereby beans cook far more efficiently than traditional methods.

The constant low-temperature applied to the base causes the food to travel up the large, spherical cooking chamber toward the narrow, short cylindrical neck. At the short cylindrical neck, the (relatively cooler) beans encounter the relatively hotter beans that have traveled more recently from the base and the "cooler" beans travel back to the base which again heats them, sending a constant flow of hotter beans from the base through the spherical cooking chamber, up the cooler short cylindrical neck where the cooler beans settle and the cyclical process is repeated continually until the beans are done and the heat source is removed.

1 Claim, 1 Drawing Sheet

Perspective View        Sectional View

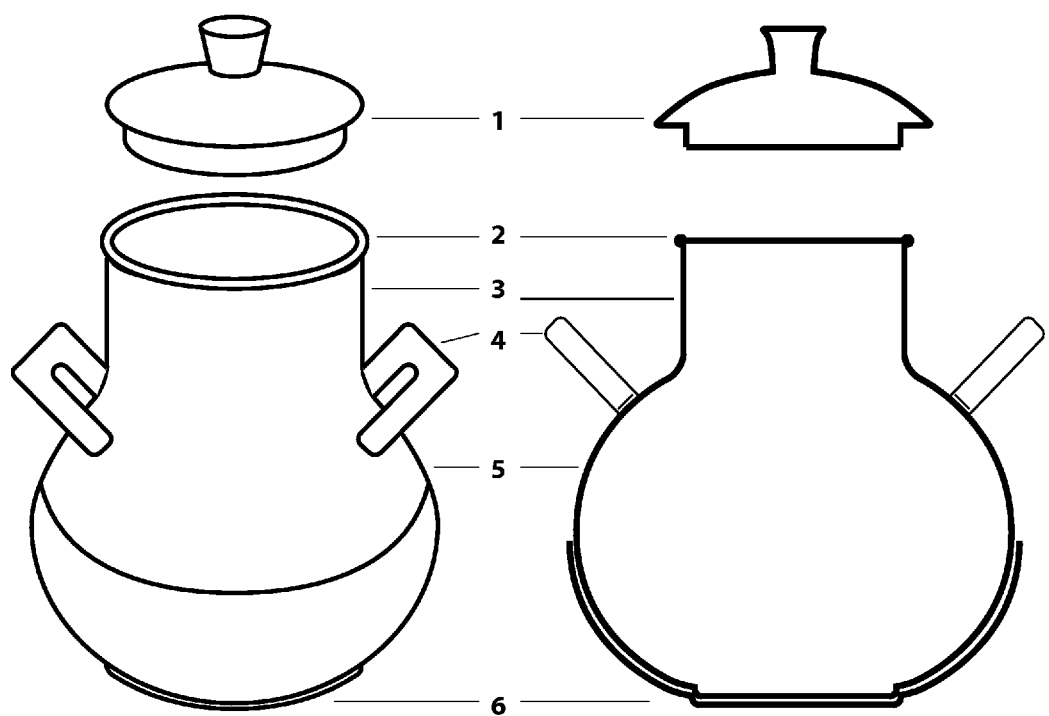
Perspective View  Sectional View

QUICK-COOK BEAN POT

FIELD OF THE INVENTION

The present invention relates to a new type of bean pot particularly to the means by which dry beans may be quickly and efficiently prepared on various non-oven type heat sources (i.e., stove top, induction hot plate) for human consumption.

BACKGROUND OF THE INVENTION

The current technology used to prepare dry beans for human consumption is a time-consuming process that often requires an overnight soak. After a thorough water soak, the beans often need hours upon hours to cook before they're ready to eat. The amount of time and energy spent in the process of preparing dry beans for consumption make many reluctant to select dry beans despite the economic and health values of using dry beans.

Because the current technology used to prepare dry beans on the stove-top relies on the otherwise-useful standard stockpot, there currently exists no attempt to improve on this prior art. Likewise, the ceramic/clay bean pot is an energy-heavy and time-consuming process for oven use. The quick-cook bean pot eliminates the need for an overnight soak and drastically reduces cook time thereby saving valuable energy and time resources.

SUMMARY OF THE INVENTION

The present invention eliminates the step for an overnight soak of beans in water and also drastically reduces cook time for dry beans to reach doneness through current methods in a stockpot. The quick-cook bean pot's design and stainless/brass/aluminum material enables beans to cook far more quickly and evenly than traditional methods.

The large spherical cooking chamber is broader than the short cylindrical neck. This broader spherical cooking chamber to narrower short cylindrical neck ratio helps beans cook rapidly. With the addition of dry beans and water, when a low heat source is applied from a stove-top (gas, electric, hot plate, or induction) to the pot base, soon the food begins to boil. The constant low-temperature applied to the base causes the food to travel up the large, spherical cooking chamber toward the short, narrow cylindrical neck. At the short, cylindrical neck, the (relatively cooler) beans encounter the relatively hotter beans that have traveled more recently from the base and the "cooler" beans travel back again to the base which heats them, sending a constant flow of hotter beans from the base through the large, spherical cooking chamber, up the cooler short cylindrical neck where the cooler beans settle and the cyclical process is repeated continually until the beans are done and the heat source is removed. The lid prevents escape of heat allowing food to cook more quickly, and also allows the cook to easily remove it in order to observe water levels and food doneness.

The low heat source can be a "simmer/low" setting on a gas or electric stove, hot plate or induction cook top. The pot will not work in a microwave, on a toaster, or in a toaster oven. It is not made for use on indoor or outdoor grills.

BRIEF DESCRIPTION OF THE DRAWINGS

The FIGURE is a plan view of the present invention on the right and a cross sectional view of the present invention on the left.

DETAILED DESCRIPTION OF THE EMBODIMENT

See the drawing to reference the numbers herein. The quick-cook pot comprises a lid (1), a lip (2), a short, narrow cylindrical neck (3), handles (4), a large, spherical cooking chamber (5), and a base (6). The base is more narrow than its spherical cooking chamber. The large, spherical cooking chamber is considerably wider than its short, narrow cylindrical neck. The short, narrow cylindrical neck meets the lip which securely fits completely detachable lid.

The perspective view shows the quick-cook bean pot with lid detached. The cross-section view also shows the quick-cook bean pot with lid detached. The lid should remain on the pot when in use, but can be removed occasionally to observe water levels and test food doneness.

The quick-cook bean pot uses the same material technology used to produce standard 18/10 stainless steel cooking pots. Its base is comprised of an even heating metal element of a multi-ply material for even heating. The metal pot is durable and non-breakable.

The quick-cook pot comprises a lip; short, narrow cylindrical neck; large, spherical cooking chamber; a base; handles; and a lid. The base is more narrow than its spherical cooking chamber. The spherical cooking chamber is much wider than its short cylindrical neck. The short cylindrical neck meets the lip which securely fits completely detachable lid.

The interior is made of stainless steel. The exterior is made of stainless steel and an extended dual-ply base of brass, copper, aluminum or other even-heat conducting metal or alloy; or a conventional multi-ply base sandwich of stainless steel and other even-heat conducting metals or alloys.

The invention claimed is:
1. A bean cooking pot, comprising:
a body with an exterior surface and an interior surface, and multi-ply layer;
said body comprising a lip defining an upper opening, narrow cylindrical neck extending downwardly from said lip, a large spherical cooking chamber extending downwardly and radially outwardly from said neck, a base below said large spherical cooking chamber which supports said large spherical cooking chamber above a supporting surface, handles extending from said large spherical cooking chamber and lid to close said upper opening;
said base and neck having a smaller circumference than a circumference of said large spherical cooking chamber;
said lip securely fits said lid, whereby said lid may be removed to observe food contained within said large spherical cooking chamber,
wherein said body is constructed of stainless steel, such that said interior surface is stainless steel and said exterior surface is stainless steel;
further wherein said multi-ply layer extends over the entirety of said base and over a lower portion of said large spherical cooking chamber terminating at a mid-portion of said large spherical cooking chamber, said multi ply layer made of materials taken from a group consisting essentially of brass, copper, aluminum or other even-heat conducting metal or alloy.

* * * * *